United States Patent [19]
Penny

[11] 3,873,234
[45] Mar. 25, 1975

[54] TURBINE ROTOR

[76] Inventor: Robert Noel Penny, 12 Alderbrook Rd., Solihull, Warwickshire, England

[22] Filed: Nov. 6, 1972

[21] Appl. No.: 304,009

[30] Foreign Application Priority Data
Nov. 10, 1971 United Kingdom ............ 52133/71

[52] U.S. Cl. .................. 416/97, 416/213, 415/115
[51] Int. Cl. ............................................. F01d 5/08
[58] Field of Search ......... 416/213, 244 A, 95, 193; 415/114, 115

[56] References Cited
UNITED STATES PATENTS

| | | | |
|---|---|---|---|
| 2,448,825 | 9/1948 | Price et al. | 416/213 X |
| 2,750,147 | 6/1956 | Smith | 416/97 |
| 2,915,279 | 12/1959 | Chamberlin | 416/97 |
| 3,294,366 | 12/1966 | Coplin | 416/213 X |
| 3,297,301 | 1/1967 | Petrie et al. | 416/95 X |
| 3,588,276 | 6/1971 | Jubb | 416/95 |
| 3,610,769 | 10/1971 | Schwedland et al. | 416/97 |
| 3,635,586 | 1/1972 | Kent et al. | 416/97 |
| 3,661,475 | 5/1972 | Anderson et al. | 416/244 X |
| 3,664,766 | 5/1972 | Rahnke | 416/244 |
| 3,719,431 | 3/1973 | Steele et al. | 416/96 |
| 3,765,793 | 10/1973 | Savonuzzi | 416/96 |

FOREIGN PATENTS OR APPLICATIONS

| | | | |
|---|---|---|---|
| 614,547 | 11/1945 | United Kingdom | 416/213 |
| 646,491 | 11/1950 | United Kingdom | 416/213 |

Primary Examiner—Everette A. Powell, Jr.
Attorney, Agent, or Firm—Edward F. Connors

[57] ABSTRACT

A turbine rotor in which each blade has a root in the form of a hollow box including a radially-outer wall forming a platform from which the blade extends, a radially-inner wall, by which the blade is secured to the periphery of a hub and radially-extending walls at each axial end of the box, the box having internal stiffening interconnecting the radially-inner and radially-outer walls intermediate the circumferential ends of the box. The stiffening may be an internal wall extending between the radially-inner and radially-outer walls and between the radially-extending walls at each axial end of the box and dividing the box into two compartments. Alternatively the stiffening may be an insert of a metallic or ceramic sponge-like material filling the box and bonded to the walls of the box.

6 Claims, 9 Drawing Figures

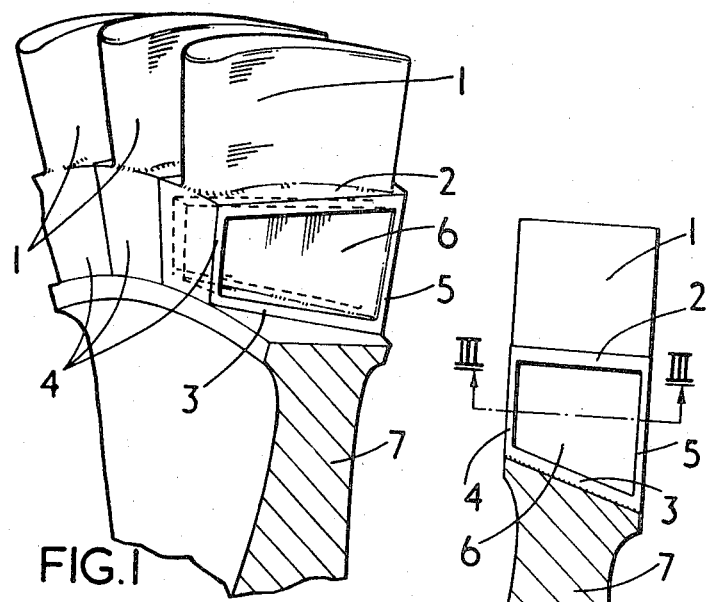
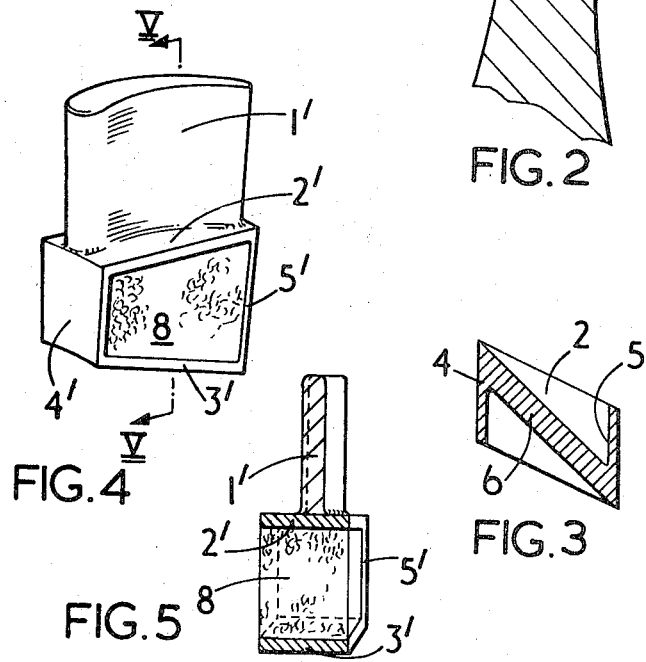
FIG.1　FIG.2　FIG.3　FIG.4　FIG.5

TURBINE ROTOR

The invention relates to a turbine rotor for a gas turbine engine, the turbine rotor being for a compressor-driving turbine or a power turbine and particularly, but not exclusively, for operation at a high temperature, e.g. above 900°C and for operation where the turbine is to start and stop at frequent intervals, as in a power-turbine or compressor-driving turbine for a gas turbine engine used for automobile propulsion.

An object of the invention is to provide a sufficiently strong, light-weight construction capable of withstanding thermal fatigue and high temperature operation and reasonably inexpensive to produce.

According to the invention, a turbine rotor comprises a hub and a plurality of blades formed separately of the hub and arranged circumferentially around the periphery of the hub, each blade having a root end in the form of a hollow box including a radially-outer wall forming a platform from which the blade extends, a radially-inner wall, by which the blade is secured to the periphery of the hub and radially-extending walls at each axial end of the box, the box having internal stiffening means interconnecting the radially-inner and radially-outer walls intermediate the circumferential ends of the box.

The stiffening means of the box of each blade may comprise an internal wall extending between the radially-inner and radially-outer walls and between the radially-extending walls at each axial end of the box, thereby dividing the box into two compartments, the internal wall, the radially-inner and radially-outer walls and the radially-extending walls being rigidly secured together or integrally formed.

Conveniently the internal wall of the box of each blade is an extension of the working part of the blade extending radially inwardly of the platform formed by the radially-outer wall of the box.

The box of each blade preferably has open ends facing in the circumferential directions of the rotor.

The hollow box construction of the root ends of the blades enables the rotor to be made lighter in weight than where the blades have solid roots and also to have a reduced moment of inertia. Moreover the cost of production is lower than in the case of solid roots. The internal stiffening means enables the blade roots to withstand the centrifugal force effected by the blades.

Instead of the internal stiffening means being a wall, the hollow box of each blade may be filled with an insert of a foam or sponge-like or expanded heat-resistant, substantially rigid, material bonded to the radially-outer and radially-inner walls and the radially-extending walls at each axial end of the box. The material may be a metal or a ceramic or ceramic-like material such as silicon nitride.

The root end of each blade is therefore of a composite nature providing strength and rigidity coupled with reduced weight. The insert also controls the transfer of heat from the blades to the hub.

The construction in accordance with the invention also enables the blades to be readily cooled and therefore according to a further feature of the invention, the blades or at least some of them, may each have at least one passage therein extending from the interior of the box of the root end of the blade through the radially-outer wall forming the platform to a radially-outer part of the blade, the circumferential ends of the box-like roots of adjacent blades being spaced apart circumferentially to form spaces through which air or other coolant can be introduced into the box-like roots.

The passage in a blade conveniently communicates with at least one opening in the trailing edge of the blade.

The turbine rotor provided by this invention may be made in at least two different materials selected in accordance with the temperature each part of the rotor has to withstand. For example, the blades or the blades and the radially-outer wall of the box-like roots thereof, including the blade extensions, where provided, may be made of one material and the box-like roots or the remainder of the box-like roots may be made of another material. The hub may be made of yet a further material.

The box-like roots of the blades are conveniently welded or otherwise secured to the periphery of the hub. Where the blades or the blades and the radially-outer walls of the box-like roots of the blades are formed separately of the box-like roots or the remainder of the box-like roots, the separately-formed parts may be welded or otherwise secured together and to the periphery of the hub.

The box-like roots or the portions thereof not formed integrally with the blades may be formed separately of corresponding parts associated with the other blades. Alternatively, the box-like roots of several adjacent blades may be formed integrally in a part-annular segment. In another construction the box-like roots of all the blades may be formed integrally in an annulus.

By way of example, three embodiments of the turbine rotor construction in accordance with the invention are now described with reference to the accompanying drawings, in which:

FIG. 1 is a perspective view of two adjacent blades and their associated box-like roots of the first embodiment;

FIG. 2 is an end view of a blade on a radial section through the hub of the rotor shown in FIG. 1;

FIG. 3 is a section through a box-like root on the line III—III in FIG. 2;

FIG. 4 is a perspective view, similar to FIG. 1, showing a blade of the second embodiment;

FIG. 5 is a section on the plane V—V indicated in FIG. 4;

Figure 6:
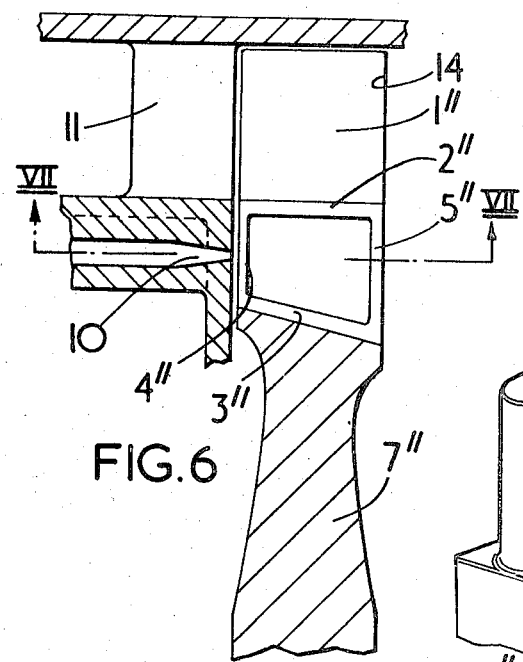
FIG. 6 is a radial section through a portion of the rotor and associated stationary structure of the third embodiment.

Referring firstly to FIGS. 1, 2 and 3, each blade 1 is cast integrally with a hollow-box-like root comprising a radially-outer wall 2, a radially-inner wall 3, radially-extending axially-spaced walls 4 and 5 at the axial ends of the rotor and a transverse internal wall 6. The radially-outer wall 2 also forms the blade platform. The radially-inner wall 3 is welded or similarly secured to the periphery of the hub 7 which is an accurate forging. The box formed by the walls 2, 3, 4 and 5 is open at its circumferential ends and thus the transverse wall 6 divides its interior into two compartments. This construction enables the blades and the roots to be made of a different material to that of the hub, in accordance with the difference in working temperature and stresses. The hollow box-like construction of the roots has the advantage of lower production cost as compared with solid root construction and also lower weight and reduced moment of inertia. The transverse wall 6 serves to stiffen the box-like root and enable it to withstand the centrifugal force due to the blade. The transverse wall 6 conveniently forms a substantially radial inward extension of the working portions of the blade 1 and may be of similar shape or have parallel side faces as shown in FIG. 3. The box-like roots of the blades are assembled end-to-end around the hub in a jig before welding, e.g., by electron beam welding. Alternatively each root may be welded in position separately. Several roots may be cast integrally in a segment or all the roots may be cast integrally in an annulus. Alternatively only the radially-inner walls 3 may be integrally formed in segments or an annulus. It is also possible for the blades 1, or the blades 1 and the platforms 2, with or without the transverse walls 6, to be cast separately of the roots or the remainder of the roots and thus be welded or otherwise secured thereto. This would enable the blades 1 and integral parts of the roots to be made of one material, the roots or the remaining portions of the roots to be made of a second material and for the hub to be made of a third material.

Instead of, or additionally to, the transverse wall 6, the box-like roots may be stiffened by inserts of a substantially rigid foam or sponge-like or expanded heat-resistant material, such as a metal or a ceramic or ceramic-like material, such as silicon nitride, bonded to the walls of the roots. The inserts control the heat transfer between the blades and the hub as well as providing a light-weight stiffenned box-like root. FIGS. 4 and 5 show a blade having a box-like root having sides similar to the blade 1 shown in FIGS. 1 to 3, like parts being shown by the same reference numbers having the suffix (1) and the insert of foam or sponge-like material being indicated by reference numeral 8.

Figure 7:
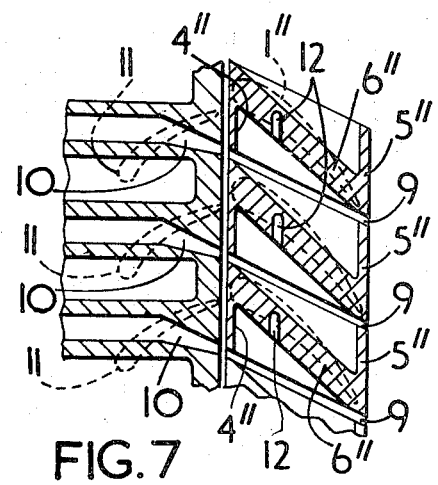
FIG. 7 is a section on the line VII—VII in FIG. 6.

In the third embodiment shown in FIGS. 6 and 7, the construction is similar to that shown and described with reference to FIGS. 1 to 3, except that the box-like roots, or the parts of the roots, except for the radially-inner wall 3, where this is formed integrally in segments or an annulus, are spaced apart circumferentially to provide radial gaps 9 between each pair of adjacent roots. Like parts also appearing in FIGS. 1 to 3 are distinguished by the suffix (11). Coolant, e.g., air, is introduced through nozzles 10 positioned radially within a ring of stator guide vanes 11 positioned alongside the rotor into the radial gaps 9 between the roots. The coolant flows into the compartments formed in the boxes of adjacent roots, through the open circumferential ends thereof and flows through a hole or holes 12 or other throughway extending from the side face of and radially through the transverse wall of the relevant root into one or more radially-extending passages 13 or 13' formed in the associated blades to the radially-outer ends thereof as indicated by arrows 16 in FIGS. 8 and 9.

Figure 8:
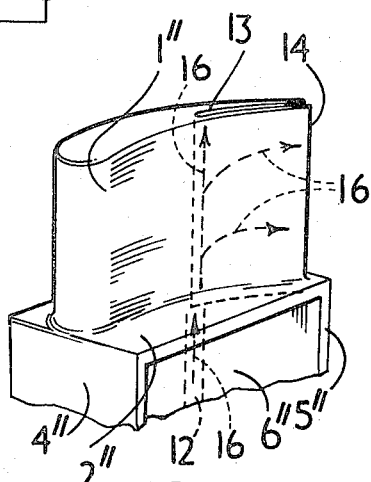
FIGS. 8 and 9 are respectively perspective views of alternative blades which may be employed with the embodiment shown in FIGS. 6 and 7.
Figure 9:
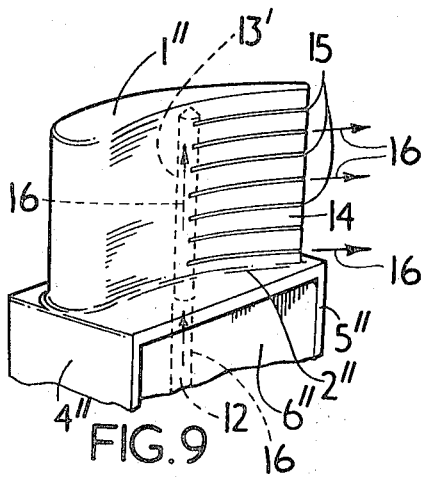

FIGS. 8 and 9 show cooling passages 13 or 13' in a blade 1". In FIG. 8 the passage 13 is a slit in the trailing edge 14 of the blade 1 and communicates at its radially-inner end with the hole 12 of the transverse wall 6" of the associated box-like root. In FIG. 9, the passage 13' communicates with a plurality of transverse passages 15 terminating in the trailing edge 14 of the blade 1".

Where the roots contain an insert 8 of foam or sponge-like or expanded heat-resistant material (as in FIGS. 4 and 5), the coolant will flow through the interstices of the insert 8 to the passages 13 or 13' in the blades 1".

What I claim as my invention and desire to secure by Letter Patent of the United States is:

1. A turbine rotor comprising a hub and a plurality of blades formed separately of the hub and arranged circumferentially around the periphery of the hub, each blade having a root end in the form of a hollow box including a radially-outer wall forming a platform from which the blade extends, a radially-inner wall which abuts the periphery of the hub and is directly attached thereto, and radially-extending walls at each axial end of the box, the box having an internal wall interconnecting the radially-inner and radially-outer walls, and the radially-extending walls at each axial end of the box, thereby dividing the box into two compartments, each open at the relevant circumferentially outer end of the box and at least some of the blades each having at least one passage therein extending from the interior of the box of the root end of the blade through the radially-outer wall forming the platform to a radially-outer part of the blade, the circumferential ends of the box-like roots of adjacent blades being spaced apart circumferentially to form spaces through which coolant can be introduced into the compartments of the box-like roots.

2. A rotor as claimed in claim 1 in which the passage in a blade communicates with at least one opening in the trailing edge of the blade.

3. A rotor as claimed in claim 1 in which the internal wall extends from the circumferential end of one of the radially-extending walls to the opposite circumferential end of the other of the radially-extending walls.

4. A rotor as claimed in claim 3 in which the internal wall of the box of each blade is an extension of the working part of the blade extending radially inwardly of the platform formed by the radially-outer wall of the box.

5. A gas turbine engine including a turbine rotor as claimed in claim 1 and having a ring of stator vanes positioned alongside the rotor and a plurality of nozzles positioned radially within the ring of stator vanes for introducing coolant through the spaces between the box-like roots of adjacent blades and into the compartments of the box-like roots between the radially-outer and the radially-inner walls.

6. A turbine rotor comprising a hub and a plurality of blades formed separately of the hub and arranged circumferentially around the periphery of the hub, each blade having a root end in the form of a hollow box including a radially-outer wall forming a platform from which the blade extends, a radially-inner wall which abuts the periphery of the hub and is directly attached thereto, and radially-extending walls at each axial end of the box, the box having an internal wall interconnecting the radially-inner and radially-outer walls and the radially-extending walls at each axial end of the box, thereby dividing the box into two compartments, each open at the relevant circumferentially outer end of the box, the circumferential ends of the box-like roots of adjacent blades being spaced apart circumferentially to form spaces through which coolant can be introduced into the compartments of the box-like roots.

* * * * *